US012038214B2

(12) United States Patent
Deetlefs et al.

(10) Patent No.: US 12,038,214 B2
(45) Date of Patent: Jul. 16, 2024

(54) METHOD FOR IMPROVING GAS BEARING FUNCTION AT LOW THERMAL COOLING POWER

(71) Applicant: Global Cooling, Inc., Athens, OH (US)

(72) Inventors: Ivan Niell Deetlefs, Helmond (NL); David M. Berchowitz, Athens, OH (US)

(73) Assignee: Global Cooling, Inc., Athens, OH (US)

( * ) Notice: Subject to any disclaimer, the term of this patent is extended or adjusted under 35 U.S.C. 154(b) by 315 days.

(21) Appl. No.: 17/720,362

(22) Filed: Apr. 14, 2022

(65) Prior Publication Data

US 2023/0332814 A1 Oct. 19, 2023

(51) Int. Cl.

| | |
|---|---|
| ***F25B 49/02*** | (2006.01) |
| ***F02G 1/043*** | (2006.01) |
| ***F02G 1/045*** | (2006.01) |
| ***F02G 1/06*** | (2006.01) |
| ***F25B 9/14*** | (2006.01) |
| ***F25B 30/02*** | (2006.01) |

(52) U.S. Cl.

CPC .......... *F25B 49/025* (2013.01); *F02G 1/0435* (2013.01); *F02G 1/045* (2013.01); *F02G 1/06* (2013.01); *F25B 9/14* (2013.01); *F25B 30/02* (2013.01); *F25B 2309/001* (2013.01); *F25B 2500/06* (2013.01); *F25B 2500/18* (2013.01); *F25B 2600/01* (2013.01); *F25B 2600/13* (2013.01); *F25B 2700/2111* (2013.01)

(58) Field of Classification Search

CPC ........... F02G 1/0435; F02G 1/045; F02G 1/06

See application file for complete search history.

(56) References Cited

U.S. PATENT DOCUMENTS 3,782,859 A * 1/1974 Schuman ................ F01B 11/00 417/375
4,667,158 A 5/1987 Redlich
2004/0055314 A1 3/2004 Shimizu et al.
2005/0229608 A1 10/2005 Keiter et al.

(Continued)

OTHER PUBLICATIONS

International Search Report for PCT/US2023/18693 dated Jul. 11, 2023.

*Primary Examiner* — Laert Dounis

(74) *Attorney, Agent, or Firm* — Frank H. Foster; Kremblas & Foster

(57) ABSTRACT

A method for increasing working gas flow rate through gas bearings of a free piston, gamma configured Stirling heat pump to avoid failure of the gas bearings while maintaining thermal cooling power. The Stirling heat pump lifts heat from a storage chamber and has pistons that are driven in reciprocation at an operating frequency by linear electric motors. A temperature control maintains a steady state storage chamber temperature by sensing storage chamber temperature and modulating piston amplitude. The invention comprises (a) driving the pistons with linear electric motors that are driven by a variable frequency, AC power source; (b) sensing the pistons' amplitude of reciprocation; and (c) if the sensed piston amplitude is less than a selected piston activation amplitude, increasing the frequency of the AC power source to increase the Stirling heat pump's operating frequency. That decreases thermal cooling power which causes the temperature control to increase piston amplitude.

14 Claims, 5 Drawing Sheets

(56) References Cited

U.S. PATENT DOCUMENTS

| | | | | |
|---|---|---|---|---|
| 2011/0005220 | A1 | 1/2011 | Berchowitz | |
| 2013/0042607 | A1 * | 2/2013 | Berchowitz | F02G 1/045 60/520 |
| 2017/0152850 | A1 * | 6/2017 | Ryu | F04B 35/045 |
| 2022/0003574 | A1 | 1/2022 | Berchowitz | |
| 2022/0341634 | A1 | 10/2022 | Berchowitz | |

* cited by examiner

Fig. 2
(PRIOR ART)
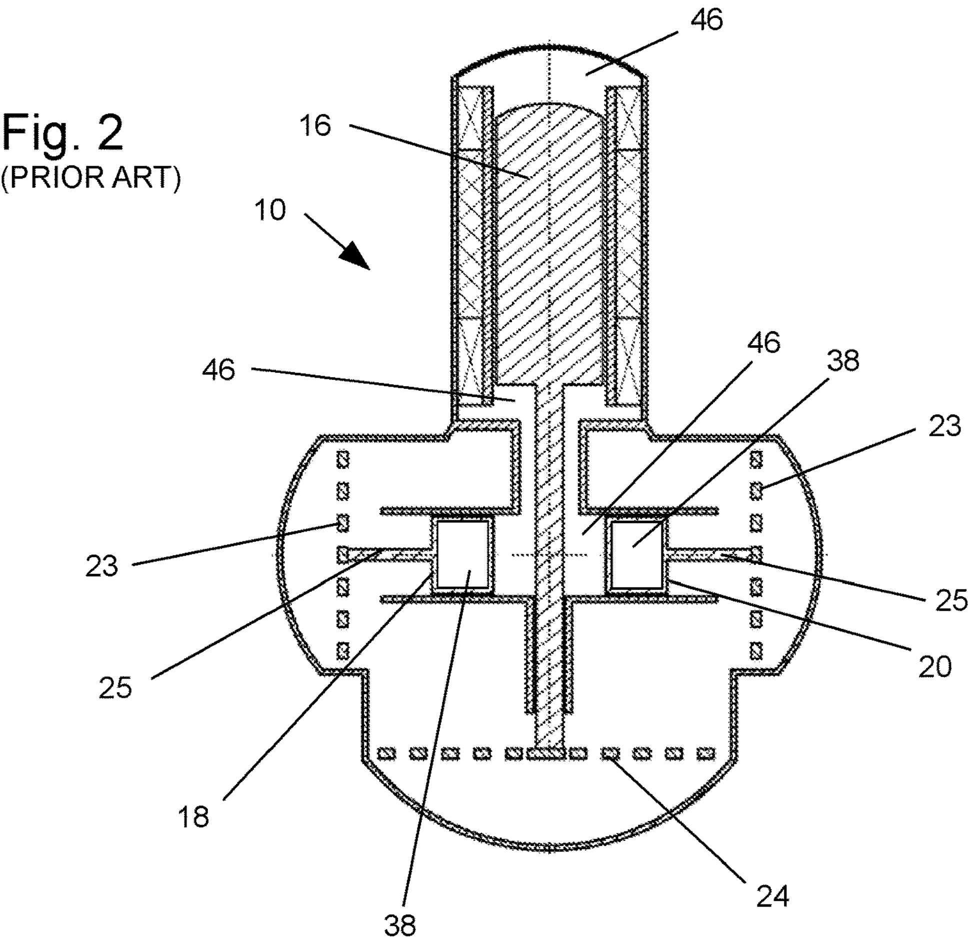
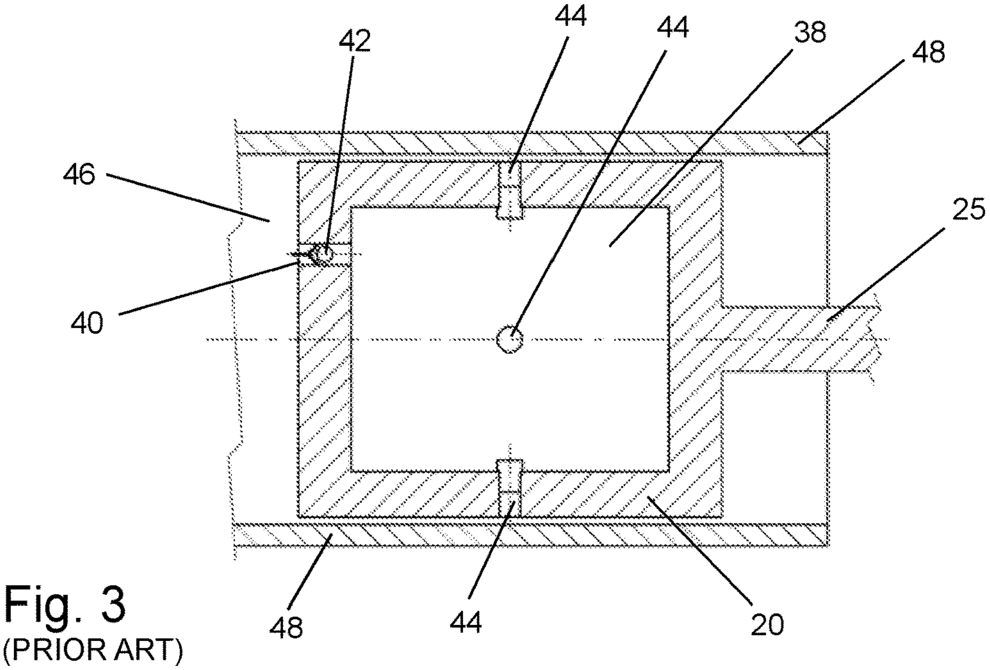
Fig. 3
(PRIOR ART)

Fig. 4
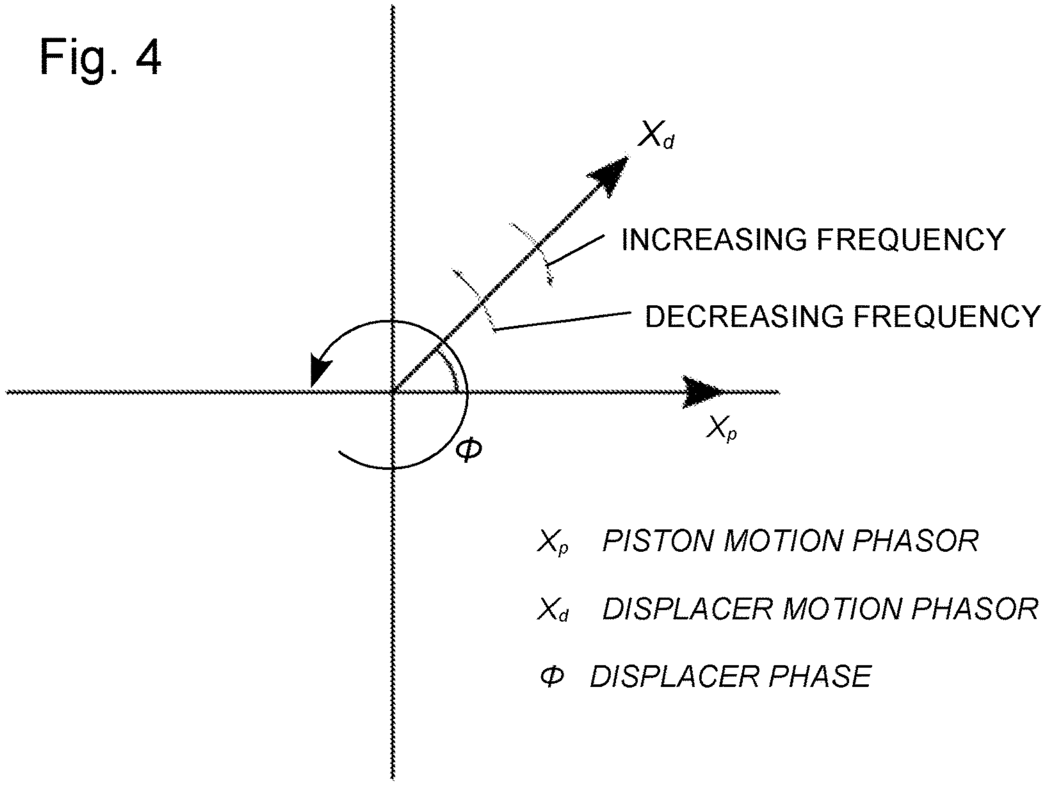
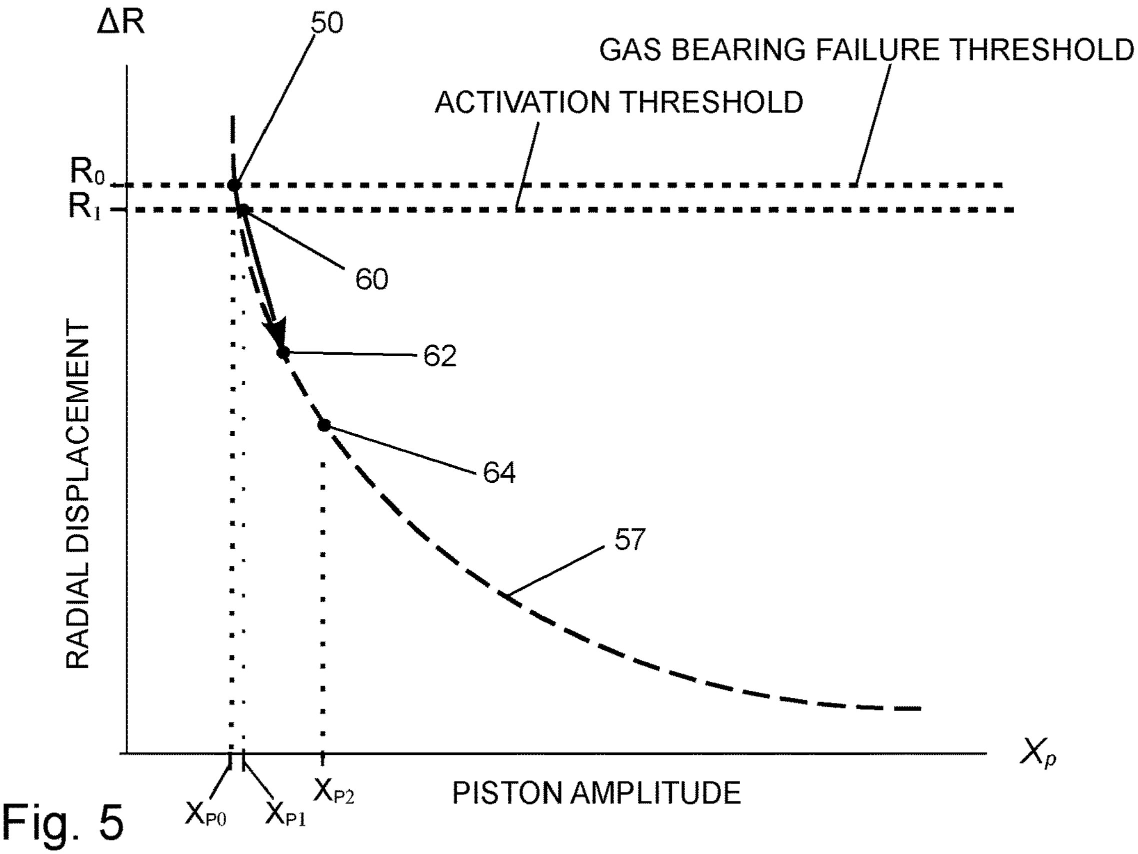
Fig. 5

Fig. 6
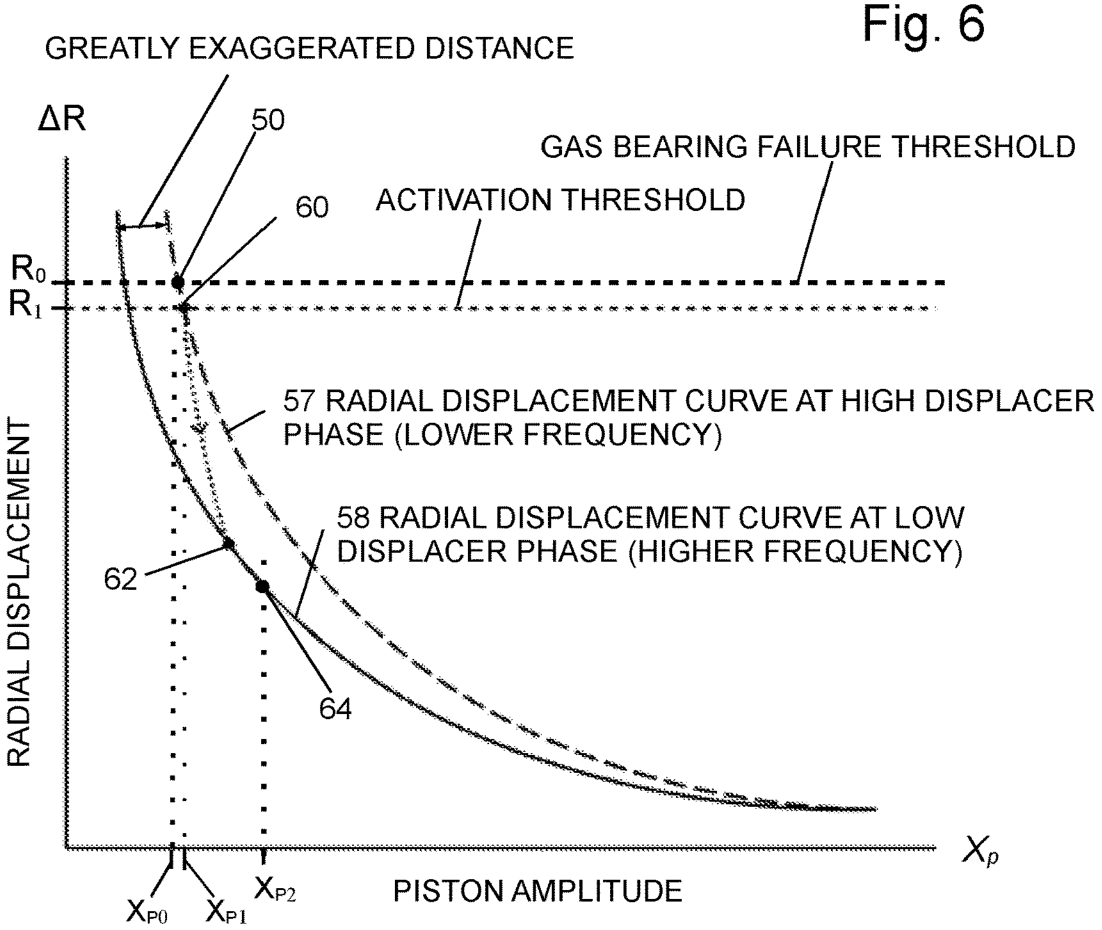
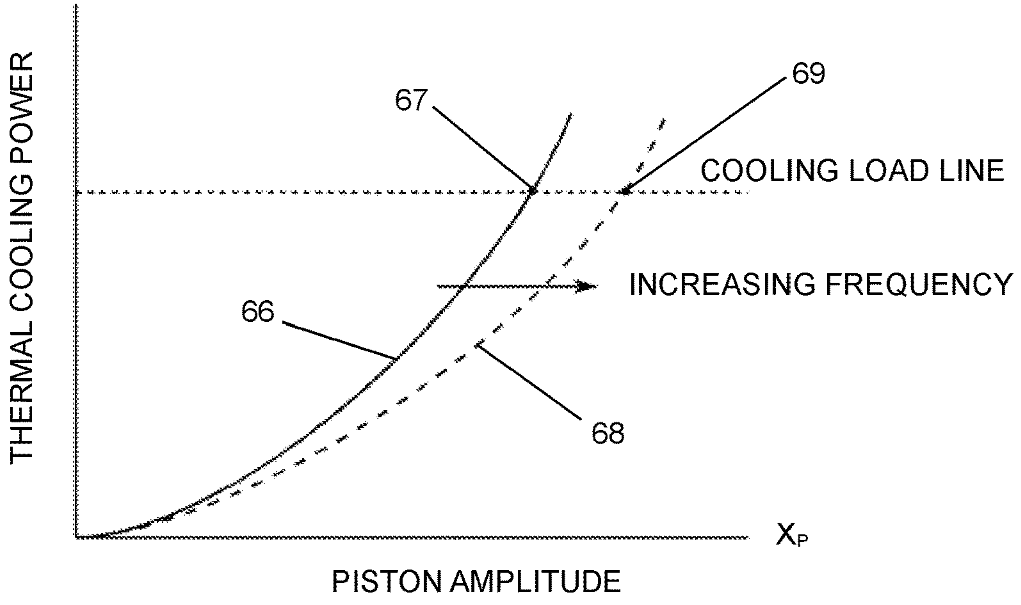
Fig. 7

METHOD FOR IMPROVING GAS BEARING FUNCTION AT LOW THERMAL COOLING POWER

BACKGROUND OF THE INVENTION

This invention relates to free piston Stirling engines used to pump heat from a lower temperature mass to a higher temperature mass. More specifically, the invention is directed to raising the higher temperature boundary of the operating temperature range for free piston Stirling engines that are used for cooling the storage chamber of refrigerators or freezers and particularly ultra-low temperature freezers. The term “cooler” is used to refer generically to devices that include a cooled chamber and a heat pump that pumps heat out of the chamber. The term “cooler” applies to freezers and refrigerators and does not imply use for any particular contents. Technical principles of the prior art and of the invention are exemplified by reference to freezers and Stirling engines used as heat pumps but are generally applicable to other types of coolers.

Stirling ultra-low temperature freezers, like many appliances, are manufactured in various models and their construction is standardized within each model. However, each model is usually useful for a variety of different applications that require different steady state operating temperatures. Therefore each model is typically designed to operate anywhere within a temperature range of steady state operating temperatures. For example one application for a particular Stirling freezer may operate at a steady state operating temperature of −20° C. and another application for the same freezer model may require a steady state operating temperature of −80° C.

In order to explain the problem that is solved by the invention, reference is made to FIGS. 1, 2 and 3.

FIG. 1 is a relatively simplified representative diagrammatic illustration that includes a gamma free piston Stirling heat pump 10 mounted to refrigerate the storage chamber 14 of a freezer 12. The storage chamber 14 has an access door 17 for insertion and withdrawal of freezer contents such as biological samples that are stored in the storage chamber 14. Because Stirling engines, including heat pumps, are well known in the prior art, the following description is a summary.

Referring to FIG. 1, a gamma free piston Stirling heat pump 10 is mounted in a refrigeration apparatus having the storage chamber 14. The Stirling heat pump 10 lifts heat from the storage chamber 14 by accepting heat into its cold head 15 and rejecting the heat at its warm end 13. The rejected heat is transferred to the ambient atmosphere through some type of known heat exchanger (not shown) such as a finned radiator.

The gamma Stirling heat pump 10 has a displacer 16 and two pistons 18 and 20. The pistons 18 and 20 reciprocate in an opposed arrangement in cylinders 19 and 21, which ideally cancels all vibration due to the pistons’ opposite directions of motion. The displacer 16 is connected by a connecting rod 22 to a planar spring 24. The pistons 18 and 20 can be connected by a rod to planar springs in a manner similar to the displacer, they can be connected to a coil spring connected to the casing 26 or they can have no mechanical spring. Working gas is sealed in the casing 26 and also acts as a spring applying a spring force to the pistons 18 and 20 so the entire Stirling heat pump 10 has a frequency of mechanical resonance. The pistons and displacer are reciprocated at a constant frequency near their resonant frequency. Although the displacer motion is not balanced, the displacer 16 has a low mass so its contribution to casing vibrations is small and generally acceptable.

The pistons 18 and 20 are driven in opposed reciprocation by AC linear electric motors so forces that would otherwise cause the casing 26 to vibrate are mutually canceled. As known in the prior art, the linear motors are formed by a pair of stator coils 28 that are fixed to a casing 26 and a ring of reciprocating permanent magnets 30 that are fixed to the pistons 18 and 20. The linear motors are conventionally driven at a selected and constant operating frequency by an alternating electrical voltage and current applied by an alternating electrical power source 32 to the stator coils 28. The electrical power source 32 is controlled by an electronic control system 34 which includes digital processing circuits and computer components. Sensed operating parameters, such as storage chamber temperature and piston amplitude, are supplied to the control system 34. Storage chamber temperature is provided by a storage chamber temperature sensor 36. Piston amplitude is provided, as known in the prior art, by computer calculation from voltage, current and power factor sensed from the electrical power applied by the electrical power source 32. Alternatively, piston amplitude can be provided by a sensor.

The control system 34 includes a temperature control that controllably varies the voltage amplitude of the power source 32 according to its stored control algorithm and based upon its input sensed operating parameters. Varying the voltage amplitude varies the piston amplitude because piston amplitude is an increasing function of voltage amplitude.

Freezers operating at ultra-low temperatures are highly insulated to provide high thermal resistance to heat loss from their storage chamber 14. When a freezer is operated at a steady state operating temperature near or at the higher temperature boundary for which the freezer was designed to operate, the thermal lift from the freezer storage chamber temperature to the ambient temperature is less than it would be if the steady state operating temperature were lower (colder). Consequently, at higher (warmer) steady state freezer operating temperatures, less thermal cooling power is required to maintain or restore the steady state operating temperature of the freezer storage chamber 14.

The steady state operating temperature of a freezer is usually controlled by applying well known negative feedback control principles to a temperature control system. The control system senses the current temperature in the freezer storage chamber 14 and increases the thermal cooling power to lower the freezer storage temperature and decreases the thermal cooling power to allow the freezer storage chamber temperature to increase. The usual manner by which the temperature control increases or decreases the thermal cooling power is to increase or decrease piston amplitude of reciprocation. Thermal cooling power is an increasing function of piston amplitude and more specifically is proportional to the square of piston amplitude. The piston amplitude is an increasing function of electric motor drive voltage. So the piston amplitude of reciprocation is increased or decreased by respectively increasing or decreasing the amplitude of the AC voltage applied to the linear electrical motor that is driving the pistons of the Stirling heat pump in reciprocation. As a result, the higher (warmer) the steady state operating temperature that is selected by the user, the lower the average piston amplitude of reciprocation needs to be.

Stirling heat pumps are provided with a gas bearing system which lubricates the pistons to minimize or prevent contact between the pistons and their cylinders and resulting excessive wear. When the temperature of the storage chamber 14 rises to a warmer temperature, the reduction in piston amplitude has an adverse effect on the gas bearing system. The principles of the gas bearing system are illustrated in FIGS. 2 and 3.

FIG. 2 illustrates a gamma free piston Stirling heat pump 10 like that shown in FIG. 1 with the symbolic representations of some components changed to facilitate description of the gas bearing system. It differs from the Stirling heat pump shown in FIG. 1 by including optional planar springs 23 connected to the pistons 18 and 20 by piston connecting rods 25. The pistons 18 and 20 each have an interior compartment that is referred to as a gas bearing plenum 38. Referring to larger scale FIG. 3, the plenums 38 have an inlet opening 40 that contains a check valve 42. The check valve 42 permits gas to flow into the plenum 38 but prevents gas flow out through the inlet opening 40. A series of spaced apart, gas bearing outlet ports 44 are annularly arranged around the cylindrical periphery of the pistons 18 and 20. As known in the prior art, alternatively the gas bearing plenum can be located in or adjacent the cylinder and the inlet openings and the series of spaced apart, gas bearing outlet ports can be formed through the cylinder.

When the Stirling heat pump 10 is operating, its displacer 16 and pistons 18 and 20 are reciprocating and the pressure in the workspace 46 varies periodically in an approximately sinusoidal manner. Whenever the working gas pressure in the work space 46 exceeds the pressure in a plenum 38, working gas flows into the plenum 38 through the inlet 40. Consequently, gas flows into the plenums 38 during the peaks of the pressure variations that are in a polarity to open the check valve 42. As a result, the plenums 38 can be charged to a gas pressure that is an increasing function of the amplitude of the pressure variation in the work space 46. Working gas also flows from the plenum 38 out all of the gas bearing ports 44 and into the space between the outer cylindrical surface of the pistons 18 and 20 and the cylindrical inner surfaces of the pistons' associated cylinders 48. This fluid flow of working gas operates as lubrication by applying a radial centering force on the reciprocating pistons and thereby minimizing or eliminating contact between the pistons 18 and 20 and their cylinders 48.

Unfortunately, a characteristic of free piston Stirling heat pumps is that the effectiveness of gas bearings declines at higher (warmer) steady state freezer operating temperatures. As explained above, at higher steady state freezer operating temperatures, less thermal cooling power is required to maintain or restore the steady state operating temperature of the freezer storage chamber. A lower thermal cooling power requirement causes the control system to reduce piston amplitude to an amplitude that supplies only the needed thermal cooling power. But the reduced piston amplitude results in a reduced pressure amplitude of the working gas in the work space 46 because pressure amplitude is an increasing function of the amplitude of reciprocation of the pistons 18 and 20. The reduced pressure amplitude results in less plenum pressure and therefore less working gas flowing through the inlet port 40 into the plenum 38 and less working gas flowing out of the gas bearing ports 44. The reduction in gas flow through the gas bearing system reduces the effectiveness of the gas bearings. In mathematical terms, gas bearing effectiveness is an increasing function of piston amplitude.

A gas bearing failure threshold ($R_0$) can be defined to be the difference between the piston radius and the cylinder radius, which is the radial distance a piston can move radially away from the central axis of the cylinder into contact with the cylinder. At that failure threshold radial displacement, piston-cylinder contact occurs which means that the gas bearings are no longer effective. For each machine, there is a piston amplitude ($X_{P0}$) at which the gas bearings reach the gas bearing failure threshold ($R_0$).

FIG. 5 is an operating characteristic curve showing piston radial displacement as a function of piston amplitude. One horizontal dashed line represents the gas bearing failure threshold $R_0$. A gas bearing failure amplitude $X_{P0}$, at which piston-cylinder contact occurs, is at the intersection 50 of the dashed curve with the gas bearing failure threshold $R_0$.

There have been instances of cooler damage as a result of a gas bearing failure and the resulting friction and wear at the piston-cylinder interface. For example, the set point temperature of the cooler may be set at the highest temperature in its nominal operating range. Then the ambient temperature may decrease as a result of cooler weather or more effective air conditioning, for example at night after employees have gone home, so less thermal cooling power is needed to maintain the set point operating temperature. The resulting decrease in the amount of heat leaking into the cooler means that less thermal cooling power is required to pump the heat out of the cooler. Consequently, the temperature control system reduces the piston amplitude to decrease the thermal cooling power. If the temperature control reduces the piston amplitude to or less than the gas bearing failure amplitude $X_{P0}$, the pistons contact the cylinder and frictional wear begins.

Consequently, in prior art coolers, the higher temperature boundary of the nominal operating temperature range must be maintained low enough so the piston amplitude is always large enough to never reach the gas bearing failure amplitude $X_{P0}$ and the consequent deterioration of the effectiveness of the gas bearings. The invention improves the effectiveness of the gas bearings of a free piston Stirling heat pump under low thermal cooling power operating conditions by preventing the piston amplitude from decreasing to the gas bearing failure amplitude ($X_{P0}$). Consequently, the invention allows the higher temperature boundary of the temperature operating range to be raised. Raising the higher temperature boundary of the temperature operating range allows the cooler to be safely operated at a higher steady state operating temperature.

SUMMARY OF THE INVENTION

The invention is a method for increasing working gas flow rate through gas bearings of a free piston, gamma configured Stirling heat pump in order to avoid a failure of the gas bearings. The Stirling heat pump cools a storage chamber of a cooler and has a displacer and pistons that are driven in reciprocation at an operating frequency by AC linear electric motors. The cooler also has a temperature control that maintains a steady state storage chamber temperature by sensing storage chamber temperature and increasing piston amplitude at temperatures above the steady state storage chamber temperature and decreasing piston amplitude at temperatures below the steady state storage chamber temperature. The method of the invention comprises:

(a) driving the pistons with linear electric motors that are driven by a variable frequency, AC power source;
(b) sensing the pistons' amplitude of reciprocation; and
(c) if the sensed piston amplitude is less than a selected piston activation amplitude, increasing the frequency of the AC power source to increase the Stirling heat pump's operating frequency.

The invention operates according to the following principles. Cooling power is proportional to the square of piston amplitude. The invention initially reduces thermal cooling power by increasing frequency which reduces the displacer phase angle which decreases thermal cooling power so that the temperature control system will eventually sense an increased storage chamber temperature and respond by increasing the thermal cooling power by increasing the piston amplitude which increases gas flow through the gas bearings to prevent gas bearing failure while maintaining thermal cooling power.

BRIEF DESCRIPTION OF THE DRAWINGS

FIG. 2 is a diagrammatic view illustrating the principal elements of the gas bearing system of the Stirling heat pump of FIG. 1.

FIG. 3 is a diagrammatic view illustrating the gas bearing plenum of pistons in the Stirling heat pump of FIG. 1.

FIG. 4 is phasor diagram illustrating the effect of drive frequency variation on the phase lead of the Stirling heat pump displacer motions ahead of the Stirling heat pump piston motions which is used in the method of the invention.

FIG. 5 is a graph illustrating the relationship, in a free piston Stirling heat pump, of piston amplitude and gas bearing effectiveness and the manner in which the method of the invention affects both.

FIG. 6 is a graph that is similar to FIG. 5 but showing an additional curve that is spaced from the dashed curve by a greatly exaggerated distance in order to illustrate a small detail in the operation of the invention that is not illustrated in FIG. 5.

FIG. 7 is a graph illustrating the manner in which the operation of a free piston Stirling heat pump is modified by the method of the invention.

Figure 1:
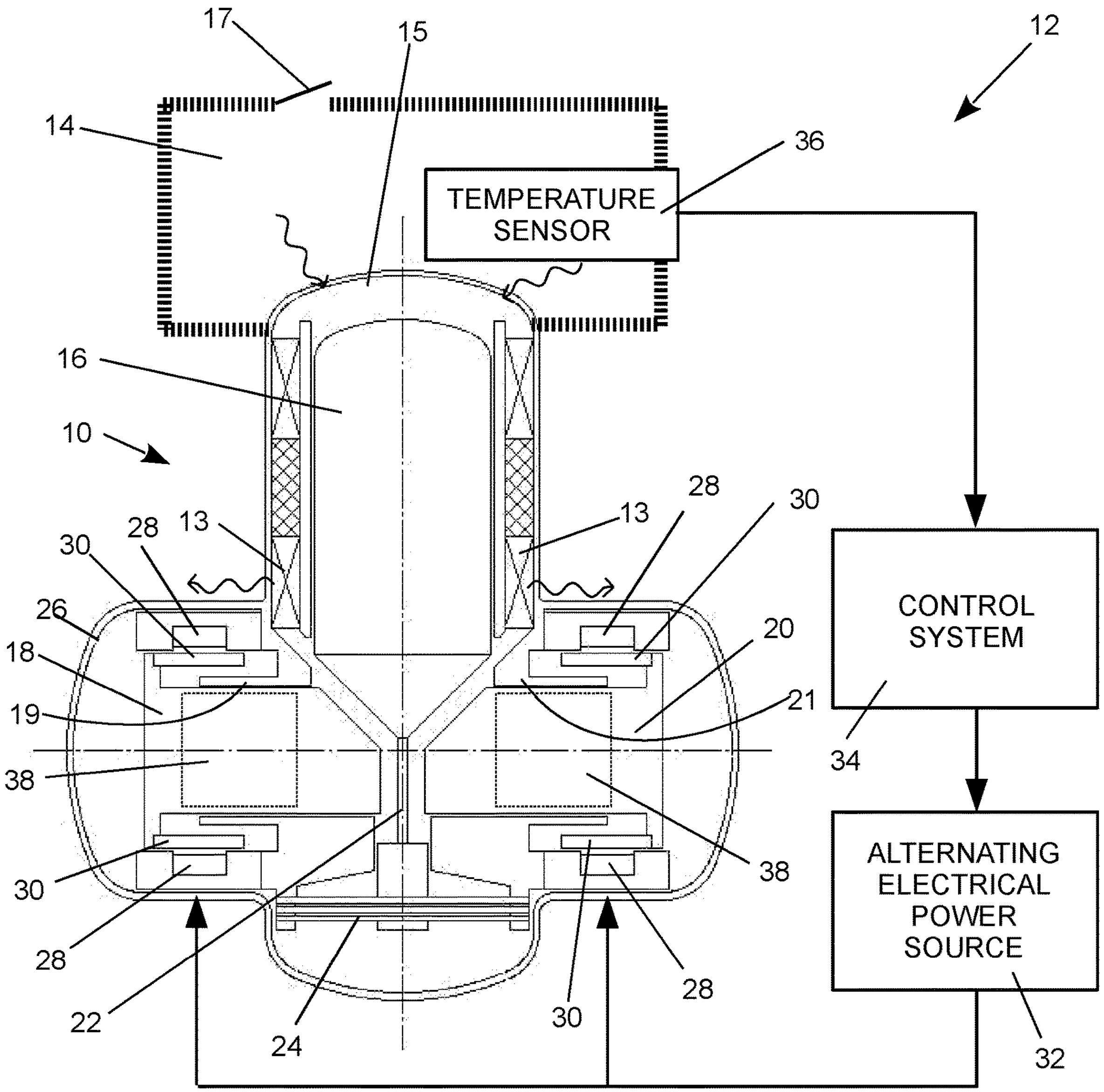
Fig. 1 (PRIOR ART)
FIG. 1 is a diagrammatic view of the principal elements of a prior art freezer.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used.

DETAILED DESCRIPTION OF THE INVENTION

Figure 8:
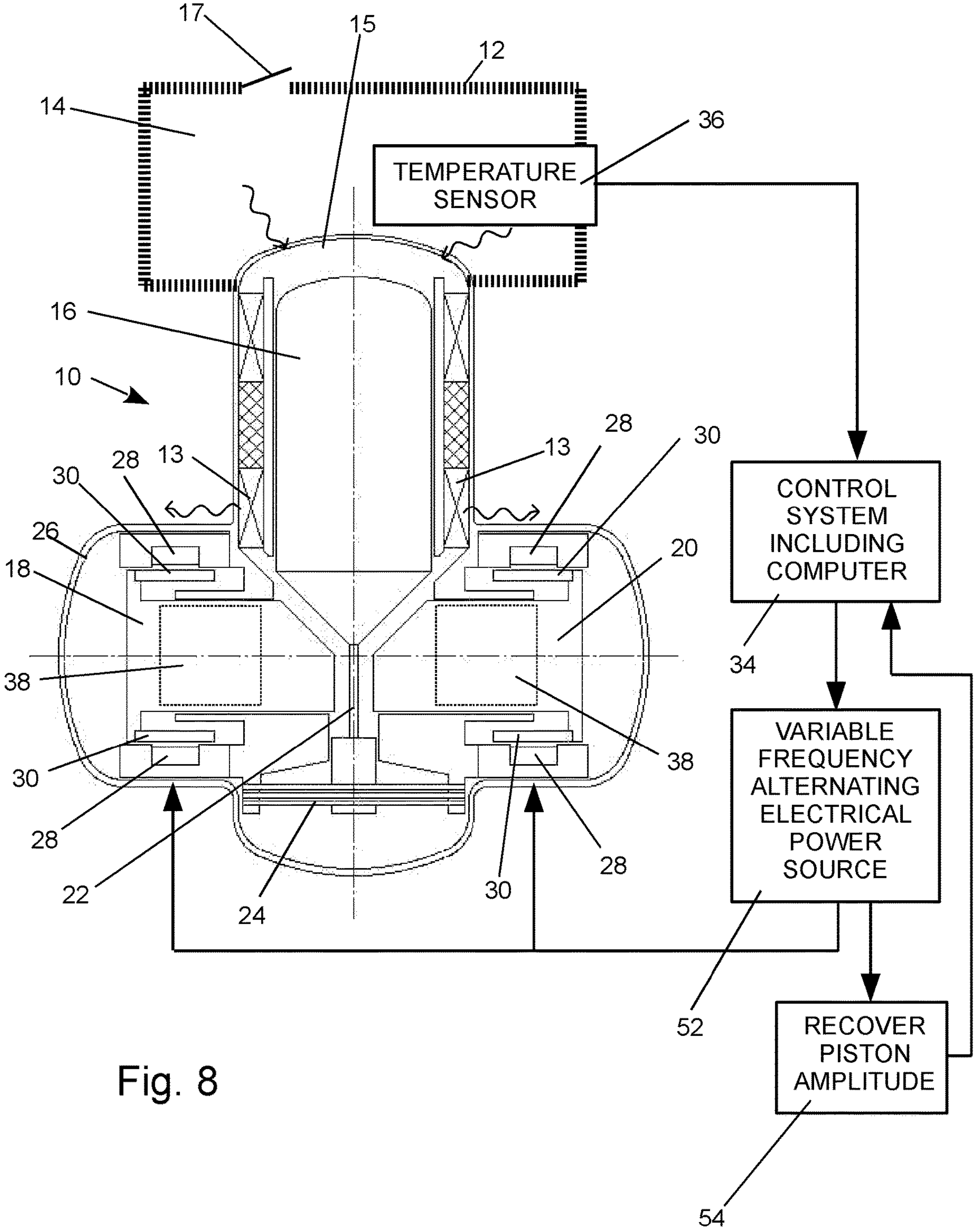
FIG. 8 is a diagram of an example of a Stirling cooler that is used to practice the method of the invention.

A physical embodiment of a cooler that is used to practice the method of the invention is illustrated in FIG. 8. It's physical structure is essentially the same as the prior art cooler illustrated in FIG. 1 except that the electrical AC power source 52 that drives the pistons 18 and 20 of the Stirling heat pump 10 is a variable frequency electrical power source 52. A variable frequency AC power source, sometimes referred to as a variable frequency drive (VFD), is essentially an oscillator circuit with an electronically variable frequency and can deliver sufficient power to drive an electric motor. Such power sources are commercially available for driving rotating electric motors and alternatively can be designed by a person of ordinary skill in the art. Common component parts have the same reference numbers in FIG. 8 as are in FIG. 1 and therefore the description of them is not repeated.

The following description of the invention begins with a description of some operating characteristics and relationships that exist in a Stirling free piston heat pump of the type previously described and how those characteristics and relationships are applied in the practice of the method of the invention. Some of those characteristics and relationships were described in the foregoing background of the invention. This description will then turn to a more detailed description that applies the method of the invention.

Basic Concepts and Principles

The method of the invention applies the following operating characteristics of a free piston, gamma configured, Stirling heat pump.

The pistons 18 and 20 and the displacer 16 reciprocate periodically and therefore their motion can be represented by the phasor diagram of FIG. 4. The amplitude of the piston reciprocation is an increasing function of the AC voltage amplitude applied to the linear electric motors that drive the pistons 18 and 20. As known in the art, the most desirable operation of a Stirling heat pump is obtained when it is designed so that the displacer leads the pistons by a phase angle in the range of 45° to 65° at a frequency near the resonant frequency.

Referring briefly to FIG. 4, if the drive frequency of the linear electric motors that drive the pistons is increased, the displacer-piston phase angle $\phi$ decreases. That phase angle decrease causes the thermal cooling power of the Stirling heat pump to decrease, even if the electric motor voltage amplitude and the piston amplitude remain unchanged. The reduced thermal cooling power results in a reduction in the rate at which heat is lifted from the colder mass in the storage chamber 14 to the warmer mass of the ambient air.

As previously explained, the Stirling heat pump has a gas bearing system that supplies working gas from its plenums. The plenums are charged with working gas by pressure variations of the working gas. The pressure amplitude of the working gas is an increasing function of the piston amplitude of reciprocation. Consequently, a reduction in piston amplitude reduces the gas flow rate through the gas bearings and a sufficient reduction in piston amplitude will allow the gas bearings to fail.

As also previously explained, a Stirling cooler has a temperature control system that continuously senses the temperature in the cooler's storage chamber, increases the Stirling heat pump's thermal cooling power by increasing piston drive voltage (and therefore piston amplitude) when the sensed temperature exceeds a set point temperature and decreases the Stirling heat pump's thermal cooling power by decreasing piston drive voltage (and therefore piston amplitude) when the sensed temperature is below a set point temperature.

With the above operating characteristics in mind, the manner in which the above characteristics are applied to practice the invention can be described. In briefest outline of the invention, if the piston amplitude decreases to a piston activation amplitude ($X_{P1}$) at which gas bearing operation is near failure due to a reduced gas flow through the gas bearings, the piston drive frequency is increased. The drive frequency increase initiates a series of changes in the operation of the Stirling heat pump that causes the temperature control system to increase the piston amplitude and thereby increase the gas flow rate through the gas bearings.

Looking at the series of changes in more detail, piston amplitude is sensed continuously or repeatedly. If the piston amplitude falls near or to an amplitude at which the gas bearings are expected to fail (gas bearing failure amplitude $X_{P0}$), the frequency of the electrical power source that drives the pistons in reciprocation is increased. The frequency increase of the electrical power source reduces the piston-displacer phase angle. The reduction of the piston-displacer phase angle reduces the thermal cooling power and therefore reduces the rate at which heat is lifted from the storage chamber 14. Consequently, the interior temperature of the storage chamber will likely rise. The rise of the storage chamber temperature will be sensed by the temperature control system. In response, the temperature control system will increase the piston amplitude in order to increase the rate of heat lift. The increase of piston amplitude increases the gas flow rate through the gas bearings in order to avoid gas bearing failure.

As will be seen, there are alternative ways of increasing the frequency. There are also various methods for reversing the frequency increase and for reducing the drive frequency to disengage the invention.

Applying the Method of the Invention

Referring to FIG. 8, the method of the invention increases the working gas flow rate through gas bearings of a free piston, gamma configured, Stirling heat pump 10 in order to avoid a failure of its gas bearings. Such a failure can occur if the temperature control system of the Stirling heat pump 10 reduces the piston amplitude to an amplitude that threatens to reduce the gas flow rate through the gas bearings to a flow rate that would make the gas bearings ineffective. The temperature control system is incorporated into the computer hardware of a control system 34. The temperature control system maintains a steady state storage chamber temperature by sensing storage chamber temperature and increasing piston amplitude at temperatures above a steady state, set point, storage chamber temperature and decreasing piston amplitude at temperatures below a steady state, set point, storage chamber temperature.

The potential for such a flow rate reduction occurs at a set point temperature at the higher boundary temperature of the nominal temperature operating range of a cooler of the type previously described and illustrated in FIG. 8. A Stirling heat pump 10 that employs the invention is thermally connected to a storage chamber 14 of the cooler. The Stirling heat pump has a displacer 16 and pistons 18 and 20 that are driven in reciprocation at an operating frequency by linear electric motors previously described.

In order to employ the invention, the pistons are driven with linear electric motors that are driven by a variable frequency, AC power source 52 rather than being driven at a constant frequency in the conventional manner. The pistons' amplitude of reciprocation is sensed and applied to the control system 34. The amplitude is sensed periodically or continuously as symbolized in FIG. 8 by piston amplitude recovery 54. The value of the sensed piston amplitude is used by the computer control system for both its temperature maintenance feedback control and for implementing the invention.

There are a variety of ways for sensing the piston amplitude. The most convenient manner of sensing the piston amplitude is according to the disclosure in U.S. Pub. US20220003574 because that method does not require an amplitude sensor. Alternatively, the prior art shows sensors that can be included in the free piston Stirling heat pump, such as U.S. Pat. No. 4,667,158. As another alternative, because the pressure amplitude of the pressure variations (wave) in the work space of the Stirling heat pump is an increasing function of piston amplitude, the piston amplitude could be sensed by sensing the pressure amplitude. A particular model can be laboratory tested to derive an algorithm that relates piston amplitude to the pressure wave amplitude or other parameters of Stirling heat pump operation.

If the sensed piston amplitude is less than a selected piston activation amplitude ($X_{P1}$), the operating frequency of the AC power source is increased to increase the frequency of reciprocation of the pistons 18 and 20. The increase in the Stirling heat pump's operating frequency reduces the Stirling heat pump's thermal cooling power. The reduction of the Stirling heat pump's thermal cooling power will allow the temperature in the storage chamber to rise. The rise in the storage chamber temperature is sensed by the temperature control system which causes the temperature control system to increase the Stirling heat pump's thermal cooling power by increasing piston amplitude. The increase in piston amplitude increases the working gas pressure amplitude. The increased working gas pressure amplitude increases the working gas flow rate through the gas bearings to make the gas bearings more effective.

The method steps described above are cyclically repeated during operation of the cooler in order to invoke operation of the method whenever the piston amplitude decreases enough to make gas bearing operation insufficiently effective. More specifically, whenever the piston amplitude falls to or below the selected piston activation amplitude ($X_{P1}$), the frequency of the AC power source is increased to initiate the above sequence of cause and effect steps. The frequency may be increased multiple times to higher and higher frequencies. Multiple increases may occur if the heat leakage from the storage chamber became small enough to prevent the storage chamber temperature from rising or permitting it to fall further.

FIG. 5 illustrates the effects of performing the above method on associated Stirling heat pump operating parameters. The dashed curve 57 of FIG. 5 illustrates, in a slightly simplified manner, the relationship between piston amplitude and piston radial displacement. Piston radial displacement is a measure of the effectiveness of the gas bearings of the Stirling heat pump. As the gas bearings become more effective, the pistons are maintained nearer the radial center of their cylinders. If the piston radial displacement increases to the cylinder radius, the piston is contacting and rubbing on the cylinder wall so the gas bearings are ineffective.

The dashed curve 57 is a characteristic operating curve of the free piston Stirling heat pump. There is a gas bearing failure threshold $R_0$ at which the piston radial displacement equals the cylinder radius so the piston contacts the cylinder. The intersection 50 of the dashed curve with the gas bearing failure threshold $R_0$ occurs at the gas bearing failure amplitude $X_{P0}$. The gas bearing failure amplitude $X_{P0}$ is the piston amplitude at which the gas flow through the gas bearings has decreased sufficiently to permit the piston to contact its cylinder.

The basic invention is to sense the piston amplitude and, if and when the sensed piston amplitude is less than a selected piston activation amplitude, the frequency of the AC power source is increased to increase the frequency of reciprocation of the pistons. The invention can be performed using the gas bearing failure amplitude $X_{P0}$ as the selected activation amplitude which causes the piston drive frequency to be increased. However, in order to better avoid piston-cylinder wear at the gas bearing failure amplitude $X_{P0}$, it is preferable to provide a safety margin that avoids a decrease in piston amplitude all the way to the gas bearing failure amplitude $X_{P0}$ before activating the frequency increase. The size of that safety margin is a matter for selection according to the professional judgment of the designing engineer. Therefor a gas bearing failure amplitude is preferably selected at a piston amplitude that is greater than the gas bearing failure amplitude $X_{P0}$ by a safety margin selected by the designing engineer. FIG. 5 shows a selected activation amplitude $X_{P1}$ which intersects an activation threshold $R_1$ at point 60. The radial distance between points 50 and 60 is the radial displacement safety margin.

If piston amplitude decreases (moving leftward) along the curve 57 all the way to the selected activation amplitude $X_{P1}$, that activation amplitude $X_{P1}$ is sensed, the drive frequency in increased and the above cause and effect sequence occurs to cause the temperature control system to increase the piston amplitude. The amplitude increase by the temperature control system moves the operation along the curve 57 to the operating point 62. As seen in FIG. 5, at the operating point 62 the free piston Stirling heat pump begins operating at a higher piston amplitude and a lower piston radial displacement. Consequently, at the operating point 62 the gas bearing are operating more effectively. The higher piston amplitude caused by the temperature control has increased the gas flow rate through the gas bearings resulting in the piston being held closer to the central axis of its cylinder (i.e. a smaller radial displacement).

Although FIG. 5 accurately depicts the operation of the invention for practical purposes, there is a slight refinement that is illustrated in FIG. 6. The decrease in the relative phase angle between the pistons and the displacer, which results from the frequency increase, causes a slight increase in the pressure amplitude although the piston amplitude has not immediately increased. This is because at the lower displacer phase angle, the pressure contributions due to the piston and displacer motions become more in phase resulting in a higher pressure amplitude for an unchanged piston amplitude. That means that, upon the frequency increase and resulting phase angle decrease, the free piston Stirling heat pump begins to operate along a characteristic operating curve that is shown as a solid line curve 58. However, in reality the curve 58 is so close to the curve 57 that it cannot be accurately illustrated as separate from the curve 57 at the scale of the drawing. Therefore, in FIG. 6 the distance between the dashed curve 57 and the solid line curve 58 has been greatly exaggerated so the curves can be seen as separate in order to illustrate the operation. For practical purposes the two curves 57 and 58 are overlying.

As described in connection with FIG. 5, upon sensing that the piston amplitude has decreased to the piston activation amplitude $X_{P1}$ the drive frequency is increased, the temperature control system increases piston amplitude resulting in operation of the free piston Stirling heat pump moving from point 60 to point 62. As explained in connection with FIG. 5, at the point 62, the free piston Stirling heat pump is operating at a higher piston amplitude and a lower piston radial displacement. Consequently, at the operating point 62 the gas bearings are operating more effectively. The higher piston amplitude has increased the gas flow rate through the gas bearings resulting in the piston being held closer to the central axis of its cylinder (i.e. a smaller radial displacement).

Thermal Inertia

Although the control systems of a cooler are able to respond to sensed parameters within seconds, milliseconds or less, a temperature change in the storage chamber of most coolers typically requires several minutes because of their efficient insulation. After increasing the piston drive frequency, the method of the invention causes the cooler's temperature control system to increase piston amplitude in order to improve gas bearing effectiveness. That increase in piston amplitude is initiated by an increase in the temperature of the cooler's storage chamber. Because a relatively long time interval is usually required before the storage chamber temperature increases, it is usually desirable to have a time delay before the piston's drive frequency is again increased. The time delay should be long enough to allow the storage chamber temperature to increase sufficiently that a temperature increase can be sensed. The length of the time delay is dependent upon the thermal inertia of the particular cooler. In the absence of a suitable time delay, once the piston activation amplitude has been sensed, the repeated application of the method of the invention before the storage chamber temperature has had time to increase could result in an excessive increase in the drive frequency. Based on experience in the field of ultra-low temperature freezers, an appropriate thermal inertia time delay should at least be in the range of between 5 minutes and one hour but preferably in the range of 15 to 30 minutes. Of course laboratory testing of a prototype cooler can be used to determine the amount of time delay that is appropriate for a particular model of a cooler and its expected conditions such as ambient temperature and expected usage.

FIG. 7 illustrates a result of increasing the piston drive frequency according to the invention. FIG. 7 shows a characteristic solid line operating curve 66 that relates piston amplitude to thermal cooling power of the Stirling heat pump before increasing the drive frequency. The temperature control system modulates the piston amplitude along the curve 66 around an operating point 67. The thermal cooling load is the cooling power that maintains the storage chamber at a set point temperature. The operating point 67 is associated with the set point temperature that was selected by the user. Before increasing the drive frequency, as the storage chamber temperature rises and falls, the temperature control system operates the Stirling heat pump along the characteristic curve 66 and around the operating point 67. When the piston drive frequency is increased according to the invention and therefore the thermal cooling power is decreased, the temperature control system increases the piston amplitude as previously described. The effect of the frequency increase and resulting phase decrease is to shift the characteristic operating curve 66 to the dashed line operating curve 68. After that shift, the temperature control system modulates the piston amplitude along the curve 68 around an operating point 69. The important feature is that the Stirling heat pump then maintains the thermal cooling power at the same cooling load line but does so at a higher piston amplitude.

Frequency Increase

The step of increasing the frequency of the AC power source in order to increase the Stirling heat pump's operating frequency can be performed in a smoothly continuous manner or can be performed in incremental steps, such as stepwise incremental steps. Regardless of which way the frequency is increased, the Stirling heat pump will have electrical, mechanical and thermal inertia. Consequently, the actual operating frequency increase will not occur instantaneously following an increase in the electric motor drive frequency. If the control system increases the frequency in increments, it is believed that a preferred increment is in the range of 0.1 Hz to 2 Hz. Of course laboratory testing of particular coolers can reveal a frequency increment that is preferred for the particular cooler.

The invention additionally allows for operation of the Stirling heat pump in an idle mode. In the prior art, when the demand for thermal cooling power is exceptionally low because heat leakage from the storage chamber is unusually low, some control systems are programmed to turn off the electrical motors, which drive the pistons of the Stirling heat pump, for an interval of time in order to reduce electrical power consumption. While energy saving are desirable, this can cause wear of the piston-cylinder interfacing surfaces. The reason is that, at the end of the shut off process and again at the beginning of restart, piston amplitude is too small to maintain the adequate operation of the gas bearings. Consequently, some wear occurs.

Because the increase in the piston drive frequency decreases the displacer-piston phase, the drive frequency can be increased enough to bring the displacer's phase lead to, or nearly to, 0°. Such a phase decrease causes the thermal cooling power to decrease to zero. In that state of operation, the pistons would be still be periodically reciprocated but would be doing no work except compressing and expanding the working gas, moving the working gas back and forth between the hot and cold work spaces and overcoming friction. Importantly, in that state the piston amplitude can be maintained above the gas bearing failure amplitude to avoid excessive wear. Although electrical power consumption would not go to zero, it would be greatly reduced and save energy because the Stirling heat pump would be doing nearly no work. This idle state is maintained until the storage chamber temperature rises above a steady state set point temperature. So this idle state provides low electrical power input consumption but the pistons are still reciprocating to maintain the effectiveness of the gas bearings.

Disengagement

As a further enhancement of the invention, there are conditions under which it can be desirable to decrease the operating frequency of the Stirling heat pump after previously increasing the frequency according to the invention. Such a frequency decrease can reverse the previous frequency increases either partially or completely. If there have been multiple frequency increases, the frequency decreases can be one step at a time, each time making no further decrease until an operating parameter, such as storage chamber temperature or piston amplitude, reaches a selected value. The frequency can be reduced by an amount equal to the net sum of all of the previous increases of the frequency of the AC power source so that the drive frequency returns to its original operating frequency in the absence of implementation of the invention.

For example, the invention can be disengaged, and the piston drive frequency returned to its original operating frequency when a piston amplitude is sensed that is greater than a selected piston activation amplitude, such as $X_{P1}$. Upon such disengagement of the invention, the temperature control system would continue to control piston amplitude. Whenever piston amplitude falls below $X_{P0}$ or $X_{P1}$ the method of the invention is re-engaged.

Preferably, there is a selected deactivation amplitude $X_{P2}$ (FIG. 5) that is a larger amplitude than the activation amplitude $X_{P1}$ by a selected safety margin. If the Stirling heat pump is operating at an increased frequency as a result of activation of the invention and a piston amplitude is sensed that exceeds the selected piston deactivation amplitude $X_{P2}$, the frequency of the AC power source driving the pistons is reduced. The frequency may be reduced in a manner that reduces the frequency to partially or to completely return the drive frequency to its original drive frequency.

The thermal inertia that is described above in connection with a frequency increase would also make it desirable to apply a thermal inertia time delay when reducing the drive frequency for the purpose of deactivating the method of the invention. Among other things the thermal inertia time delay would prevent unnecessary oscillation of the control system in performing the steps. For example, the step of reducing the frequency of the AC power source would not be repeated less than a selected thermal inertia time delay following a previous decrease of the operating frequency. As a more specific example, the thermal inertia time delay is in the range of 15 to 30 minutes and can be applied to partial or complete reversals of previous frequency increases.

The invention has been described in terms of increasing the piston drive frequency above the designed normal drive frequency at which the Stirling heat pump is driven when the piston amplitude has not fallen to a piston activation amplitude $X_{P1}$. The further enhancement of reversing the frequency increases by reducing the drive frequency is also described immediately above. However, it is believed that there is a limit to the amount of frequency decrease. The preferred limit is that the frequency would not be reduced lower than the designed normal drive frequency although it could be reduced some amount below the designed normal drive frequency. However, it should be understood that continuing to increase the displacer phase lead by reducing the frequency would eventually result in a performance drop-off. There would also eventually be a performance drop-off from excessively increasing the frequency. Frequency changes have the effects that are described above but if the frequency change goes too far, machine performance drops off. Frequency changes do not continue to have the same desirable effects on the operation of the Stirling heat pump regardless of how much the frequency changed.

Definitions

Cooler—refers generically to devices that include a cooled chamber and a Stirling heat pump that pumps heat out of the chamber, such as freezers and refrigerators.

Gas bearing failure threshold ($R_0$)—the radial displacement of the piston from the central axis of the cylinder at which the piston contacts the cylinder which is the radial displacement at which the gas bearing is marginally functional. It is the clearance gap between the piston and the cylinder when the piston is centered in the cylinder.

Gas bearing failure amplitude ($X_{P0}$)—piston amplitude at the gas bearing failure threshold.

Activation threshold ($R_1$)—the radial displacement of the piston from the central axis of the cylinder which is less than the gas bearing failure threshold and at which the increase in the operating frequency is preferably activated according to the invention.

Piston activation amplitude ($X_{P1}$).—The piston amplitude at the activation threshold. The piston amplitude that the designer selects as near enough to the gas bearing failure amplitude that the invention should be activated.

Piston deactivation amplitude ($X_{P2}$).—The piston amplitude at which increases of the frequency of the AC power source from practicing the invention are reversed by reducing the frequency. The frequency reductions can be partial, such as in increments, or can be a complete disengagement of the net sum of the frequency increases of the invention to leave the frequency increase steps of the invention being at least temporarily unpracticed.

Pressure amplitude—The amplitude of the variations of working gas pressure in the work space of the free piston Stirling heat pump. The "peak" is the "amplitude" of the alternating pressure in the heat pump.

Temperature control system—The part of the control system that increases piston amplitude to increase thermal cooling power when the sensed storage chamber temperature rises above a set point operating temperature and reduces piston amplitude when the temperature falls below the set point operating temperature according to feedback control principles.

Thermal inertia time delay—A time delay selected by the designing engineer that is long enough to wait for thermal inertia to allow a temperature change in the storage chamber to occur that can be sensed by the temperature sensor. This time delay prevents repeated increases of the drive frequency before thermal inertia has permitted a temperature increase to be sensed.

REFERENCE NUMBERS

10 gamma free piston Stirling heat pump
12 freezer
13 warm end of free piston Stirling heat pump
14 storage chamber
15 cold end of free piston Stirling heat pump
16 displacer
17 access door
18 and 20 pistons
19 and 21 cylinders for pistons 18 and 20
22 displacer connecting rod
23 optional planar springs for pistons (FIG. 2 only)
24 planar spring of displacer
25 optional connecting rods (FIG. 2 only)
26 casing
28 stator coils
30 reciprocating permanent magnets fixed to pistons
32 AC electrical power source
34 control system
36 temperature sensor
38 gas bearing plenums
40 inlet of gas bearing plenums
42 Check valve
44 radial gas bearing ports
46 work space of Stirling heat pump
48 piston cylinders
50 graphical intersection point
52 variable frequency power source
54 piston amplitude recovery (sensing)
57 principal operating curve of the free piston Stirling heat pump
58 secondary operating curve of the free piston Stirling heat pump
60 graphical intersection point
62 graphical intersection point
64 graphical intersection point
66 operating characteristic curve before increasing drive frequency
67 operating point before invention is activated
68 operating characteristic curve after increasing drive frequency
69 operating point after activation of the invention This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for increasing working gas flow rate through gas bearings of a free piston, gamma configured Stirling heat pump in order to avoid a failure of the gas bearings, the Stirling heat pump being thermally connected to a storage chamber of a cooler, the Stirling heat pump having a displacer and having pistons driven in reciprocation at an operating frequency by linear electric motors, the cooler also having a temperature control that maintains a steady state storage chamber temperature by sensing storage chamber temperature and increasing piston amplitude at temperatures above the steady state storage chamber temperature and decreasing piston amplitude at temperatures below the steady state storage chamber temperature, the method comprising:

(a) driving the pistons with the linear electric motors, that are driven by a variable frequency, AC power source;
(b) sensing the pistons' amplitude of reciprocation; and
(c) if the sensed piston amplitude is less than a selected piston activation amplitude, increasing the frequency of the AC power source to increase the Stirling heat pump's operating frequency;

wherein the increase in the operating frequency reduces the Stirling heat pump's thermal cooling power causing the temperature control to increase the Stirling heat pump's thermal cooling power by increasing piston amplitude and thereby increasing working gas pressure amplitude to increase working gas flow rate through the gas bearings.

2. The method according to claim 1 wherein the steps of claim 1 are cyclically repeated.

3. The method according to claim 2 wherein the Stirling heat pump has a gas bearing failure threshold $R_0$ at a gas bearing failure amplitude $X_{P0}$ and the selected piston activation amplitude is a piston amplitude $X_{P1}$ that is greater than the gas bearing failure amplitude $X_{P0}$ by a selected margin of safety.

4. The method according to claim 3 wherein the step of increasing the Stirling heat pump's operating frequency is not repeated less than a selected thermal inertia time delay following a previous increase of the operating frequency.

5. The method according to claim 4 wherein the thermal inertia time delay is in the range of 15 to 30 minutes.

6. The method according to claim 4 wherein steps of increasing the Stirling heat pump's operating frequency are incremental frequency steps.

7. The method according to claim 6 wherein the incremental frequency steps are in the range of 0.1 Hz to 2 Hz.

8. The method according to claim 4 where each step of increasing the Stirling heat pump's operating frequency is a smoothly continuous increase.

9. The method according to claim 2 wherein the AC power source frequency is increased sufficiently to reduce the thermal cooling power to substantially zero.

10. The method according to claim 2 wherein the method further comprises:

if the Stirling heat pump is operating at an increased frequency and the piston amplitude exceeds a selected piston deactivation amplitude ($X_{P2}$), reducing the frequency of the AC power source to reduce the Stirling heat pump's operating frequency.

11. The method according to claim 10 wherein:

(a) the Stirling heat pump has a gas bearing failure threshold $R_0$ at a gas bearing failure amplitude $X_{P0}$ and the selected piston activation amplitude is a piston amplitude $X_{P1}$ that is greater than the gas bearing failure amplitude $X_{P0}$ by a selected margin of safety; and (b) the selected piston deactivation amplitude ($X_{P2}$) is greater than the selected piston activation amplitude $X_{P1}$.

12. The method according to claim 11 and further comprising:

the step of reducing the frequency of the AC power source to reduce the Stirling heat pump's operating frequency reduces the frequency of the AC power source by an amount equal to the net sum of all the increases of the frequency of the AC power source.

13. The method according to claim 12 wherein the step of reducing the frequency of the AC power source is not repeated less than a selected thermal inertia time delay following a previous decrease of the operating frequency.

14. The method according to claim 13 wherein the thermal inertia time delay is in the range of 15 to 30 minutes.

* * * * *